United States Patent Office 3,647,884
Patented Mar. 7, 1972

3,647,884
LIQUID-VAPOR PHASE OXIDATION METHOD FOR PRODUCING DIALKYL SULFOXIDES
Masanori Tatsumi and Hisao Abe, Kamakura, Japan, assignors to Toray Industries, Inc., Tokyo, Japan
Filed Mar. 11, 1970, Ser. No. 18,501
Int. Cl. C07c 147/14
U.S. Cl. 260—607 A                          4 Claims

ABSTRACT OF THE DISCLOSURE

An improved liquid-vapor phase oxidation method for producing dialkyl sulfoxides which comprises feeding a nitrogenous oxide gaseous catalyst, a molecular oxygen-containing gas and a liquid dialkyl sulfide into an oxidizing zone of the gas-liquid concurrent tower type from thereunder, and withdrawing the liquid reaction product containing a corresponding dialkyl sulfoxide from the upper part of the liquid phase in said zone, characterized by introducing a purge gas into the cooled upper reaction area maintained at a temperature of 15 to 45° C. to purge a part of said catalyst and withdraw it from a space at the upper end of said oxidizing zone, then conducting a flow of the liquid reaction mixture to a bubble tower-type purging zone maintained at a temperature exceeding 45° C. but not over 100° C., introducing a purge gas to purge the remainder of the catalyst present in the liquid reaction product, and withdrawing the liquid reaction product from said purging zone.

---

Figure 1:
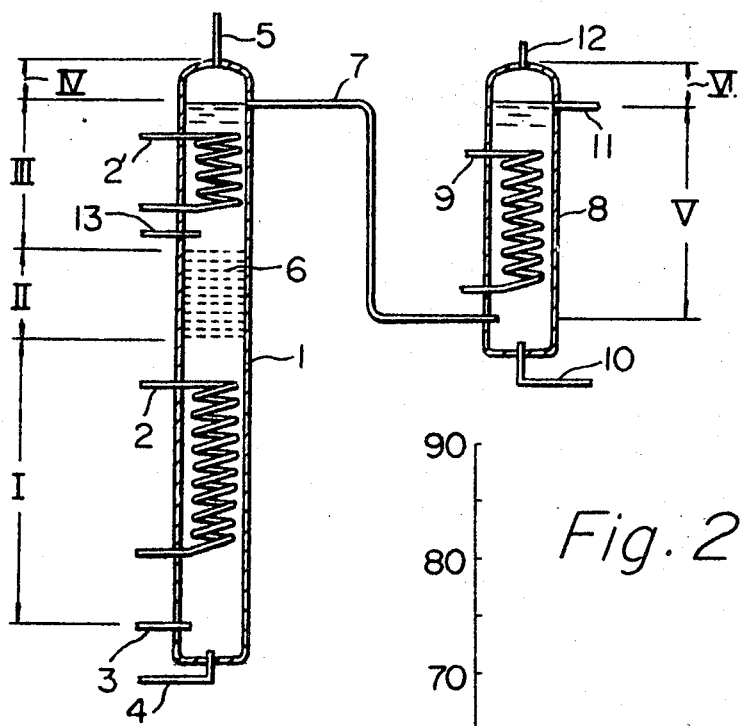

This invention relates to an improved method for producing dialkyl sulfoxides by oxidizing dialkyl sulfides, and more particularly to an improved liquid-vapor phase oxidation method for producing dialkyl sulfoxides which comprises feeding a nitrogenous oxide gaseous catalyst, a molecular oxygen-containing gas and a liquid dialkyl sulfide into an oxidizing zone of the gas-liquid concurrent tower type from thereunder, and withdrawing the liquid reaction product containing a corresponding dialkyl sulfoxide from the upper part of the liquid phase in said zone, characterized by:

(a) cooling an area at the upper part of the liquid phase in said reaction zone to a temperature of 15 to 45° C.;
(b) introducing a purge gas into the cooled area to purge a part of said catalyst and withdraw it from a space at the upper end of said oxidizing zone;
(c) conducting a flow of the liquid reaction mixture from the upper part of said liquid phase to a bubble tower-type purging zone maintained at a temperature exceeding 45° C. but not over 100° C.;
(d) introducing a purge gas from the lower part of said purging zone to purge the remainder of the catalyst present in the liquid reaction product; and
(e) withdrawing the liquid reaction product from said purging zone.

It is known to produce dimethyl sulfoxide by oxidizing dimethyl sulfide in the gaseous phase with oxygen or air using nitric oxide and/or other oxygen-transmitting nitric oxides as a catalyst (see U.S. Pat. 2,581,050). With a view to overcoming the difficulties of this gaseous phase oxidation, there was proposed a liquid-vapor phase oxidation to be effected in an oxidation reaction zone of the gas-liquid countercurrent tower type (see U.S. Pat. 2,702,824).

In the liquid-vapor phase oxidation, the amount of molecular oxygen fed to the reaction system may sufficiently be about a theoretical amount with regard to a liquid dialkyl sulfide. So the amount of oxygen discharged outside the system as unreacted waste gas is small, and this method of reaction is preferable from the standpoint of the amount of oxygen required. The method, however, presents various difficulties as mentioned below.

In the liquid-vapor phase oxidation, the conversion, in most cases, reaches 90% or above, but the resulting dialkyl sulfoxide contains unnegligible amounts of unreacted dialkyl sulfide and nitrogenous oxide catalyst. To separate and remove these substances, neutralization with alkali and distillation need be performed. Often, the neutralized salt precipitates in the distillation step and causes troubles. Furthermore, the gas in a space above a liquid phase reaction zone usually consists of unreacted oxygen, starting dialkyl sulfide and nitrogenous oxide gaseous catalyst, and often forms a gaseous mixture of the dialkyl sulfide and oxygen having concentrations within the explosion limit of dimethyl sulfide. This involves a serious danger and constitutes a setback against the commercial-scape practice of the liquid-vapor phase oxidation.

It is also known from U.S. Pat. 2,935,533 that dimethyl sulfide is reacted with a solution of $N_2O_4$ in dimethyl sulfoxide. According to this method, the reaction is carried out using an excess of dimethyl sulfide, and therefore, purging is conducted in two towers in order to recover dimethyl sulfide. In a first tower, waste gas is used for purging, and in a second tower, $N_2$, $CO_2$ or air is used. In contrast, in the method of the present invention, the purging is carried out under conditions such that the dissolved catalyst and unreacted dimethyl sulfide are conjointly present.

It has now been found that these defects of the prior arts can be eliminated by effecting a first-stage purging under conditions that satisfy the requirements (a) and (b) of the invention as hereinabove described and a second-stage purging under conditions that satisfy the requirements (c), (d) and (e) of the invention as hereinabove described.

Accordingly, an object of the present invention is to provide an improved process for producing dialkyl sulfoxides by subjecting dialkyl sulfides to a liquid-vapor phase oxidation, in which the occurrence of an explosion phenomenon is avoided, the ratios of utilization and recovery of the catalyst are improved together an increased conversion, and a purifying step can be advantageously and easily effected with a decreased amount of the residual catalyst.

Many other objects and advantages of the present invention will become apparent from the description which follows.

Figure 2:
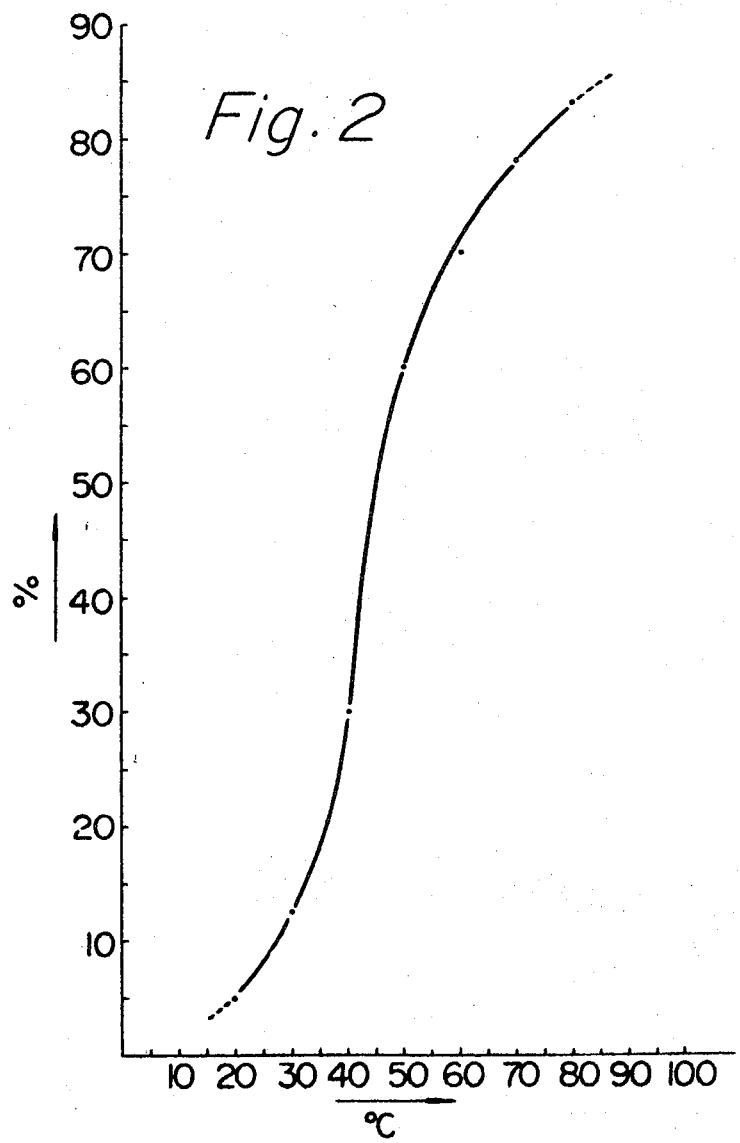

To facilitate understanding, the process of the present invention will be described in detail with reference to the accompanying drawings in which:

FIG. 1 is a schematic sectional view showing one example of an apparatus suitable for practising the method of the present invention; and FIG. 2 is a graphic representation illustrating the relation of temperatures at which the nitrogeneous oxide catalyst is purged to the ratio of the catalyst discharged by purging.

With reference to FIG. 1, a known nitrogenous oxide gaseous catalyst, such as $NO_2$, $N_2O_3$, $N_2O_4$ or mixtures of them in suitable combinations, preferably a catalyst compound selected from the group consisting of $NO_2$ and $N_2O_4$, and a molecular oxygen-containing gas such as oxygen gas or air having high oxygen concentration are fed through a pipe 4 into a reaction tower 1 which forms a gas-liquid concurrent tower type oxidation zone. On the other hand, a starting liquid dialkyl sulfide is fed into the lower portion of said reaction tower through the pipe 4. The liquid dialkyl sulfide so fed is oxidised with the molecular oxygen-containing gas in the presence of the catalyst. The liquid phase and the vapor phase flow concurrently and reach the upper part of the reaction tower. The liquid reaction product is flowed out from a pipe 7. It is preferred that the amount of the catalyst used in the oxidation reaction should be about 1–15 mol percent calculated as $NO_2$ based on the dimethyl sulfide, and the amount of oxygen should be about 0.5 to 0.55 mol based on the dimethyl sulfide.

In the embodiment shown in FIG. 1, the molecular oxygen-containing gas and the nitrogenous oxide catalyst are fed together into the reaction zone from the pipe 4. If desired, however, each of them can be fed through a separate pipe. Suitable distributing porous plates or distributing annular porous nozzles can be employed so as to ensure a good diffusion of the gas supplied.

Since the reaction is exothermic, it is better to cool the reaction zone by means of a suitable cooling device. In FIG. 1, cooling is effected by means of a pipe coil 1, but a jacket-type cooling means can also be used. Within the coil 2 is placed such a cooling medium as water or brine to effect the cooling. The reaction temperature should better be adjusted to 15 to 45° C., and it is desirable to operate at a temperature of 20 to 35° C. The reaction substantially takes place in zone I indicated in FIG. 1. The amounts of a starting dialkyl sulfide, catalyst and molecular oxygen-containing gas to be fed into the reaction tower and the reaction temperature are controlled and the size of zone I is designed so that the reaction in zone I is conducted until a conversion of the dialkyl sulfide reaches 85%, preferably 95%.

In FIG. 1, zone II is an isolating zone. This zone can be omitted, but is preferably provided. In the embodiment shown in FIG. 1, zone II is constructed of a plurality of porous plates 6, but an equivalent effect can be obtained by using buffer plates.

The upper part of the liquid phase in the reaction zone, for instance, zone III in FIG. 1, usually a zone where the conversion of the dialkyl sulfide has exceeded 85%, preferably 95%, is cooled to 15–45° C., and a purge gas is introduced into the cooled zone to purge part of the nitrogenous oxide catalyst. The purged nitrogenous oxide catalyst is discharged from a space at the upper end of the oxidation reaction zone, for instance, zone IV in FIG. 1, through an exhaust gas pipe 5. The reference numeral 13 represents a pipe for introduction of a purge gas. To better the distribution of the purge gas into the reaction liquor, distributing porous plates or distributing annular porous tubes can be employed. In the embodiment shown there, a cooling coil 2' same as coil 2 is used, but other cooling expedient can be used in the present invention.

The gas in zone IV consists mainly of unreacted molecular oxygen, unreacted dialkyl sulfide vapor, and nitrogenous oxide catalyst. According to the method of the present invention, it is possible to solve the problem of explosive gas which has heretofore constituted a grave setback against operation, in conjunction with the adjustment of the temperature in a zone at the upper portion of the liquid phase of the reaction zone, the purging of part of the catalyst in the first-stage purging conducted in this reaction zone, and a reduction of the ratio of oxygen to dialkyl sulfide vapor in the gaseous mixture to a range outside the explosion limit by means of said purge gas.

When the temperature of the upper portion of the liquid phase of the reaction zone is below 15° C., freezing of the reaction liquid is likely to occur. When it exceeds 45° C., the nitrogenous oxide catalyst in the reaction liquid is purged excessively out of the system and is likely to reduce the catalytic efficiency. Furthermore, the liquid in the upper portion falls down within the reaction tower because of the difference in the catalyst concentration between the upper part and the lower part of the liquid phase, and back-mixing occurs between the upper and lower portions. This results in a reduction of the catalyst concentration in the lower portion where a substantial reaction takes place, and is likely to lower the conversion.

Suitable purge gases include air, nitrogen, oxygen and carbon dioxide, and air is preferred. Amounts of the purge gas vary according to such factors as the temperatures of the liquid phase in the lower portion of the reaction zone (zones I and II), amounts of oxygen and catalyst fed to the lower portion of the reaction zone and rates of the dialkyl sulfide fed. But the ratio may be such that a good diffusion of heat at the space in the upper end (zone IV) of the oxidation reaction zone is ensured, and should be outside the explosion limit of the mixed gas in said space. For instance, when dimethyl sulfide is used as the starting dialkyl sulfide, it is preferred that the purge gas be fed in an amount below the explosion limit (4–55% by volume), preferably below 1% by volume.

The provision of the isolating zone II is preferred to overcome the disadvantages which may be caused by back-mixing of the lower and upper parts of the liquid phase in the reaction zone.

A liquid flow of the reaction product from the upper part of the liquid phase in the reaction zone is introduced into the lower portion of a purge tower 8 which forms a gas-liquid concurrent tower type purging zone through the pipe 7. This purging zone is provided with a heating coil pipe 9 adapted to control the temperature of said zone over 45° C. but not over 100° C. The purge gas is introduced through a pipe 10 to purge the remainder of the catalyst present in the liquid. Similar modifications to those mentioned with respect to the reaction zone above are possible in designing the heating means, the introductory ports of the pipes 7 and 10 or distributing means for a purge gas passing through the pipe 10.

The purged catalyst and the purge gas are withdrawn from the space (zone VI) at the upper end of the purging zone, and are discarded or recycled to the reaction zone after being absorbed into the dialkyl sulfoxide. On the other hand, crude liquid dialkyl sulfoxide, reaction product, is flowed out from the upper part of the liquid phase (zone V) of the purging zone through a pipe 11, and recovered.

The use of a pump is not particularly required if the liquid level of tower 1 is the same as that of tower 8 or the liquid level of tower 8 is lower than that of tower 1. If desired, however, a pump for transporting the liquid reaction product can be provided at a suitable place of the pipe 7. In the purging zone, too, it is preferable to control an amount of the purge gas to be fed in the same manner as hereinabove described with respect to the first-stage purging in the reaction zone. Suitable purge gases are those described hereinabove. The same purge gas may be used both in the first-stage purging and in the second-stage purging. Or it is possible, for instance, to use air as the purge gas in the reaction zone, and nitrogen as the purge gas in the purging zone.

According to the method of the present invention, the first-stage purging is effected while maintaining the temperature of the upper portion of the liquid phase in the reaction zone at 15–45° C., preferably 20–35° C. While controlling the concentration of the gas in the space at the upper end of the reaction zone below that at which an explosive gas is formed in said space, unreacted dialkyl sulfide is removed to the greatest possible extent. A part of the catalyst is purged to an extent such as to prevent a reduction in the conversion owing to an excessive purging of the nitrogeneous oxide catalyst. Then, the second-stage purging is effected in the purging zone maintained at a temperature above 45° C. but not over 100° C., preferably 50–70° C. thereby to remove the remainder of the catalyst and minor amounts of still remaining unreacted dialkyl sulfide completely with a view to avoiding troubles in the purification step. In accordance with the foregoing procedure, there can be obtained a crude dialkyl sulfoxide of such a purity as will enable the purification step to be effected very easily as compared with the conventional process.

The liquid-vapor phase oxidation method of the present invention can be applied to the production of sulfoxides from other lower dialkyl sulfides such as diethyl sulfide, dipropyl sulfide, dibutyl sulfide and ethylpropyl sulfide, but produces good results when used to produce dimethyl sulfoxide from dimethyl sulfide.

It will be readily seen from FIG. 2 why the second-stage purging of the present invention should be carried out at a temperature higher than that used in the first-stage purging, preferably at a temperature higher than 50° C. The rate of the nitrogenous oxide catalyst to be purged and discharged in the purging zone varies depending upon such factors as the extent of distribution of the purge gas and the time of contact between the purge gas and the liquid, but is most largely affected by the temperature at which the purging is effected. FIG. 2 illustrates the relation between the purging temperature and the discharge rate when the residence time of the reaction product in the purging tower is one hour and the ratio of volume of the amount of the purge gas supplied to the amount of the liquid reaction product is 100:1. It is seen from FIG. 2 that the rate of discharge of the catalyst by purging abruptly increases around 40° C., and the rate of 30% at 40° C. is doubled at 50° C.

According to the method of the present invention, not only the occurrence of explosion in the reaction zone, which constitutes the most serious setback against the commercial-scale operation, can be avoided, but also many other advantages can be obtained. Among these advantages are:

(1) Increased conversion of dialkyl sulfides: Since it is possible to utilize a larger area of the reaction apparatus and the catalyst can be maintained at a high concentration in the reaction system, an incresed conversion of the dialkyl sulfide and an increased yield of dialkyl sulfoxide can be achieved.

(2) Increased ratios of utilizing and recovering the catalyst: Since the maintenance of the catalyst in the reaction system is improved as mentioned in (1) above, the amount of the catalyst to be fed into the reaction system can be smaller. The ratio of recovery of the catalyst also increases because of an increased ratio of purging the catalyst in the purging tower.

(3) Improvement in fire-prevention: Those skilled in the art well know that there are a number of explosion accidents in the process of producing dimethyl sulfoxide. Many of these accidents have been caused by the explosion of a gaseous phase containing dimethyl sulfide. This danger can be dexterously avoided in accordance with the present invention.

(4) An amount of the nitrogenous oxide catalyst dissolved in the liquid reaction product can be markedly reduced. Thus, neutralization required in the subsequent purifying step can be effected easily, and the amount of a salt (sodium nitrate or sodium nitrite in the case of using sodium hydroxide in the neutralization) occurring in the neutralization step can be reduced. This contributes to the obviation of complexity and troubles incident to the precipitation of the salt in a distillation tower or evaporator in the subsequent distilling step.

One embodiment of the method of the present invention will be given below by way of working example.

EXAMPLE 1

A 300 mm. long double tube-type purging tower was connected to the top of a tube-type reactor tower having an inner diameter of 30 mm. and a length of 500 mm. and provided with cooling jackets. A liquid flowed out from the top of the tower was received in a separately provided double tube-type purging tower having a length of 300 mm. From the lower part of the reactor, 1.55 mol/hour of oxygen was fed together with 3.1 mol/hour of dimethyl sulfide and 0.08 mol/hour of nitrogen peroxide. The jackets provided at the upper and lower parts of the reactor were adapted to cool the reactor by passing water at 20° C. therein. Warm water at 80° C. was passed through the jacket of the second purging tower. Air was passed at a rate of 40 liters per hour into the purging part of the reactor and into the second purging tower. The conversion of dimethyl sulfide according to the present example was found to be 98.5%. Comparison of this example with comparative Example 1 below shows that in spite of a smaller amount of the catalyst, a higher reactivity was attained in the present invention.

COMPARATIVE EXAMPLE 1

The same reactor as used in Example 1 was used, but the second purging tower was omitted. Warm water at 80° C. was passed through a double tube at the top of the reactor, and a substantial purging of the catalyst was performed there. The starting materials were fed into the reactor in the same amounts as used in Example 1, but the catalyst was used in an amount of 0.14 mol/hour. It was found that the conversion of dimethyl sulfide was 85%.

From the initial stage of reaction, the gaseous phase at the upper part of the reactor had been within the explosion limit, and the temperature rose to 80–100° C. Because of a low conversion, unreacted dimethyl sulfide was difficult to remove, and the yield of odor-free dimethyl sulfoxide was as low as 60%.

We claim:
1. In a liquid-vapor phase oxidation method for producing dialkyl sulfoxides by feeding a nitrogeneous oxide gaseous catalyst, a molecular oxygen-containing gas and a liquid dialkyl sulfide into an oxidizing zone of the gas-liquid concurrent tower type from thereunder and withdrawing the liquid reaction product containing a corresponding dialkyl sulfoxide from the upper part of the liquid phase in said zone, the improvement comprising:
    (a) cooling an area at the upper part of the liquid phase in said reaction zone to a temperature of 15 to 45° C.;
    (b) introducing a purge gas into the cooled area to purge a part of said catalyst and withdraw it from a space at the upper end of said oxidizing zone;
    (c) conducting a flow of the liquid reaction mixture from the upper part of said liquid phase to a bubble tower-type purging zone maintained at a temperature exceeding 45° C. but not over 100° C.;
    (d) introducing a purge gas from the lower part of said purging zone to purge the remainder of the catalyst present in the liquid reaction product; and
    (e) withdrawing the liquid reaction product from said purging zone.
2. A process according to claim 1 wherein said purge gas is selected from the group consisting of air, nitrogen, oxygen and carbon dioxide.
3. A process according to claim 1 wherein the temperature of said purging zone in step (c) is over 50° C. but not over 100° C.
4. A process according to claim 1 wherein the nitrogenous oxide catalyst is $NO_2$, $N_2O_3$ or $N_2O_4$.

References Cited
UNITED STATES PATENTS

| | | | |
|---|---|---|---|
| 2,935,532 | 5/1960 | Hübenett et al. | 260—607 A |
| 2,935,533 | 5/1960 | Hübenett | 260—607 A |
| 2,938,927 | 5/1960 | Tomlinson | 260—607 A |

JOSEPH REBOLD, Primary Examiner

D. R. PHILLIPS, Assistant Examiner

U.S. Cl. X.R.

260—607 D